United States Patent
Smith

[15] 3,661,286
[45] May 9, 1972

[54] VEHICLE TRAILER

[72] Inventor: Marjorie Ann M. Smith, 1441 West 190th Street, Gardena, Calif. 90247

[22] Filed: June 1, 1970

[21] Appl. No.: 42,015

[52] U.S. Cl............................214/506, 280/414, 280/80 B
[51] Int. Cl...........................................................B60p 3/10
[58] Field of Search................214/505, 506; 280/80 B, 414; 187/8.41

[56] References Cited

UNITED STATES PATENTS

| | | | |
|---|---|---|---|
| 2,744,643 | 5/1956 | Hipp | 214/506 |
| 2,332,326 | 10/1943 | Lex | 280/80 B X |
| 2,682,419 | 6/1954 | Wolf | 280/80 B X |
| 2,065,107 | 12/1936 | Turner et al. | 104/50 |

FOREIGN PATENTS OR APPLICATIONS

| | | | |
|---|---|---|---|
| 726,877 | 3/1932 | France | 214/505 |

*Primary Examiner*—Albert J. Makay
*Attorney*—Sokolski & Wohlgemuth

[57] ABSTRACT

A vehicle trailer has a pair of parallel runners for supporting the vehicle to be towed, these runners being joined together to form an integral structure by means of cross braces. A triangular tongue member for connecting the trailer to a towing vehicle is pivotally attached to each of the runners by means of hinge devices so as to allow the tilting of the runner structure relative to the tongue, means further being provided to lock the tongue to the runners for normal towing. The device further includes a simple wheel-axle structure which is removably attached to the runners for ready adjustment of its longitudinal position therealong for optimum handling of the load.

7 Claims, 13 Drawing Figures

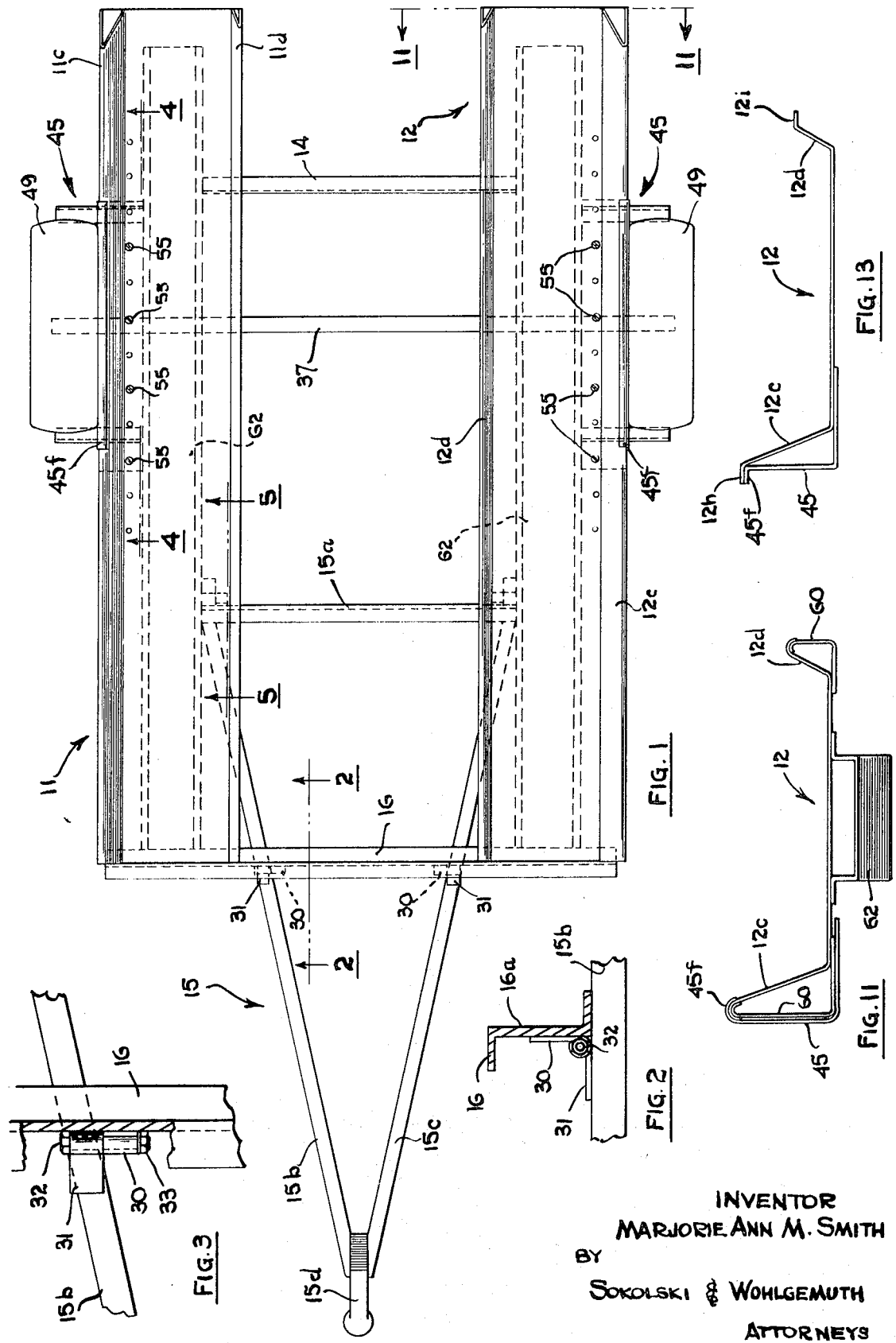

PATENTED MAY 9 1972 3,661,286

INVENTOR
MARJORIE ANN M. SMITH
BY
SOKOLSKI & WOHLGEMUTH
ATTORNEYS

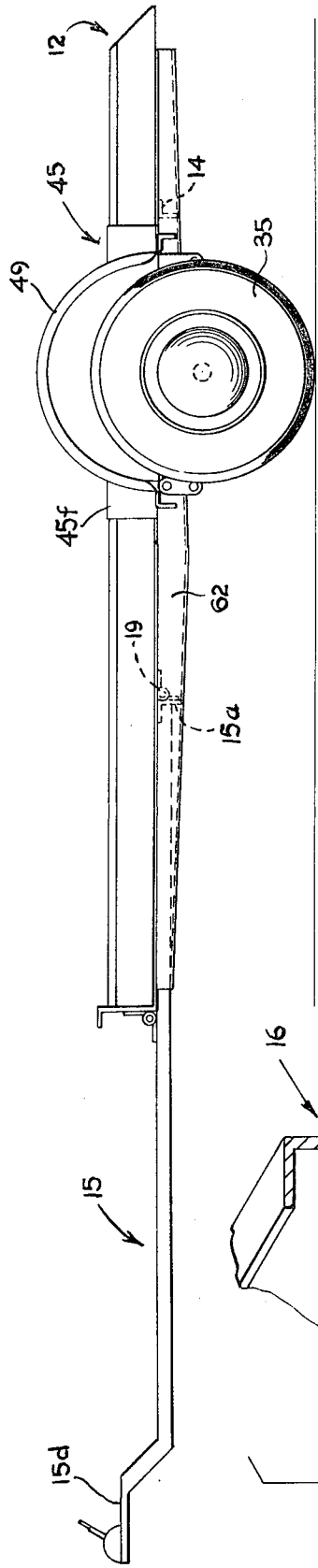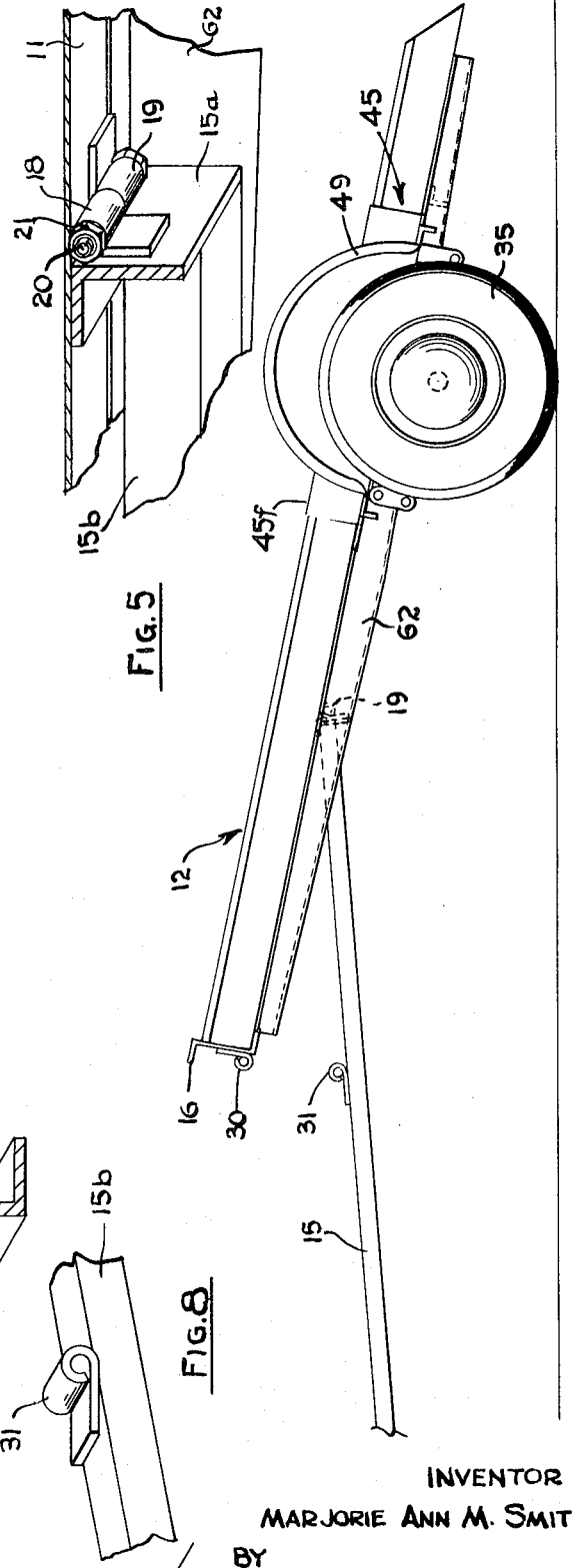

VEHICLE TRAILER

This invention relates to vehicle trailers and more particularly to such a trailer utilizing a pair of parallel runners for supporting an automobile to be towed.

Open trailers utilizing runner structures for supporting automobiles to be towed by another vehicle are utilized extensively for transporting vehicles. This type of trailer is used, for example, in transporting racing cars to and from a racetrack, conveying a disabled automobile, particularly of the expensive sport car variety where there is some concern about damage to the body thereof with normal towing, conveying specialized work vehicles to and from a work site, etc.

Prior art designs for this type of trailer often lack as good a strength to weight ratio as to be desired. This factor becomes particularly significant where the trailer is utilized for towing by an ordinary passenger vehicle and requires handling by a single person. Further, many of the prior art designs tend to be overly expensive and complicated in their construction. A further shortcoming of certain prior art designs is a lack of versatility in their adjustment to handle various types of loads. Also, many trailers are somewhat cumbersome and difficult to handle in the loading and unloading of vehicles to be transported.

The trailer of this invention overcomes the aforementioned shortcomings of prior art trailers in providing a device having a high strength to weight ratio which utilizes a minimum number of parts and is of simple and economical construction. Further, the trailer of this invention can be readily adjusted to handle various loads in an optimum manner and includes a tilting mechanism for bringing the runners to the ground for loading vehicles thereon and unloading vehicles therefrom.

It is, therefore, the principal object of this invention to provide an improved vehicle trailer of simple and economical fabrication which has a high strength to weight ratio.

It is another object of this invention to provide an improved vehicle trailer which can be readily adjusted in the field for optimum handling of particular loads which has a simple and efficient mechanism for loading an unloading.

Other objects of this invention will become apparent as the description proceeds in connection with the accompanying drawings of which:

FIG. 1 is a top plan view of one embodiment of the device of the invention;

FIG. 2 is a cross-sectional view taken along the plane indicated by 2—2 in FIG. 1;

FIG. 3 is a top plan view partially in sections illustrating the tongue locking mechanism of the device of FIG. 1;

FIG. 5 is a cross-sectional view taken along the plane indicated by 5—5 in FIG. 1;

FIG. 6 is an elevational view illustrating the embodiment of FIG. 1;

FIG. 7 is an elevational view illustrating the embodiment of FIGS. 1 and 6 tilted towards the loading position;

FIG. 8 is a perspective view illustrating the operation of the locking mechanism of the embodiment of FIG. 1;

FIG. 11 is an end elevational view illustrating the runner structure of the embodiment of FIG. 1;

FIG. 13 is an end elevational view illustrating the runner structure of another embodiment of the device of the invention.

Figure 4:
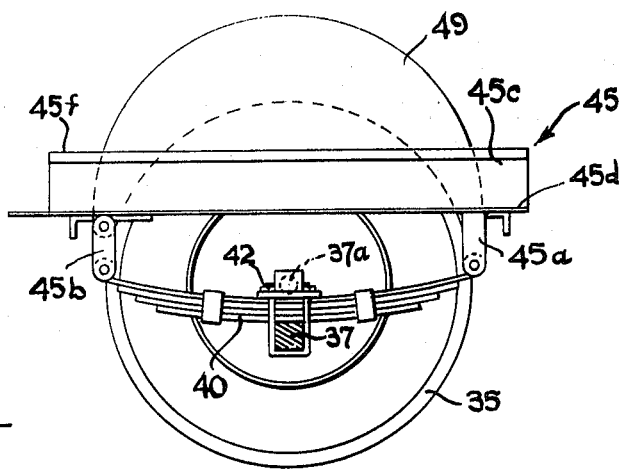
FIG. 4 is an elevational view taken along the plane indicated by 4—4 in FIG. 1.

Briefly described, the trailer of the invention comprises a pair of parallel runner members which are spaced from each other in parallel relationship and interconnected by means of cross braces. The trailer wheel axles are preferably connected to support the runner structure through springs which are suspended between bracket members. These bracket members are removably attached to the runners so as to enable longitudinal positional adjustment relative thereto for optimum handling of the particular load involved. A triangular tongue structure is provided for attaching the trailer to the tow vehicle, the base member of the triangle being pivotally connected at each of the ends thereof to a respective one of the runners to enable tilting of the runner structure relative to the tongue for the loading and unloading of a vehicle. The tongue member further includes means for locking it to the runner structure to prevent pivotal movement therebetween during transportation of the vehicle. The runner members have side wall portions which are angulated outwardly and in certain embodiments include triangular reinforcement members. One embodiment of the invention also includes a reinforcement member running along the bottom of each of the runners, this member having a tapered hat-shaped cross-section.

Referring now to FIGS. 1–10, one embodiment of the device of the invention is illustrated. This embodiment has a high strength to weight ratio and includes reinforcement for the runner structure for greatest load handling capabilities.

Runner members 11 and 12 are joined together and held in a parallel spaced relationship by means of cross braces 14 and 16 which may be welded to the bottom surfaces of the runners.

Brace member 16 extends substantially all the way across the front portion of the trailer and includes a vertical portion 16a which acts as a front stop which helps prevent the vehicle from inadvertently rolling off the front of the trailer. Tongue member 15 is triangularly shaped and has a base portion 15a which joins together the two arms 15b and 15c of the triangle. The tongue member is preferably constructed of metal tubing to provide a high strength to weight ratio and to furnish a conduit for wiring for the trailer tail lights. Attachment member 15d is utilized to attach the tongue to a towing vehicle. As best shown in FIG. 5, tongue base portion 15a has hinge sleeves 18 welded thereto near each of the opposite ends thereof. Runners 11 and 12 have hinge sleeves 19 welded to the bottom thereof. Tongue 15 is pivotally attached to runners 11 and 12 by means of hinge bolts 20 which extend through hinge sleeves 18 and 19 and are held in position by means of nuts 21. The runner structure thus may be tilted for the loading and unloading of a vehicle on and off runways 11 and 12 as indicated in FIG. 7. The tongue member thus may be held in position attached to the tow vehicle while the loading and unloading is being accomplished, thus greatly facilitating the loading operation. Further, this obviates the necessity for having any separate foldable extension members at the ends of the runway for loading and unloading, thus making for a more economical and less cumbersome structure, having fewer parts. Further, the attachment of the tongue to the runners rather than to the axle as in most prior art devices makes for a higher stability tow. Mating hinge sleeves 30 and 31 are welded respectively to bracing members 16 and tongue arms 15b and 15c as best shown in FIGS. 2, 3 and 8. With the runner structure in its towing position, pivotal motion thereof relative to tongue 15 is prevented by means of bolts 32 which are fitted through sleeves 30 and 31 and held thereto by means of nuts 33.

Figure 9:
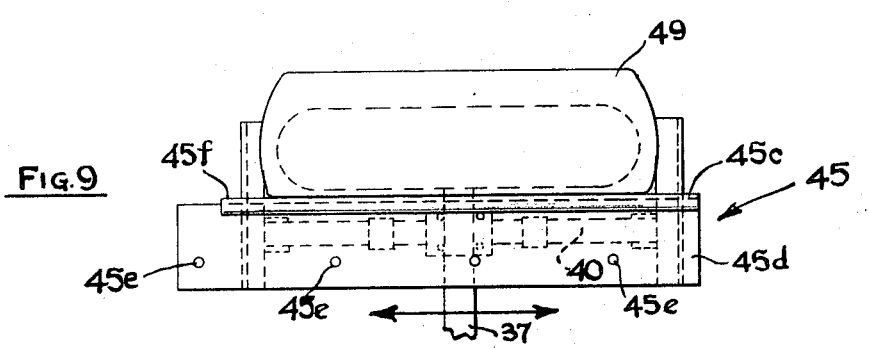
FIG. 9 is a top plan view illustrating the wheel and axle assembly of the embodiment of FIG. 1.
Figure 10:
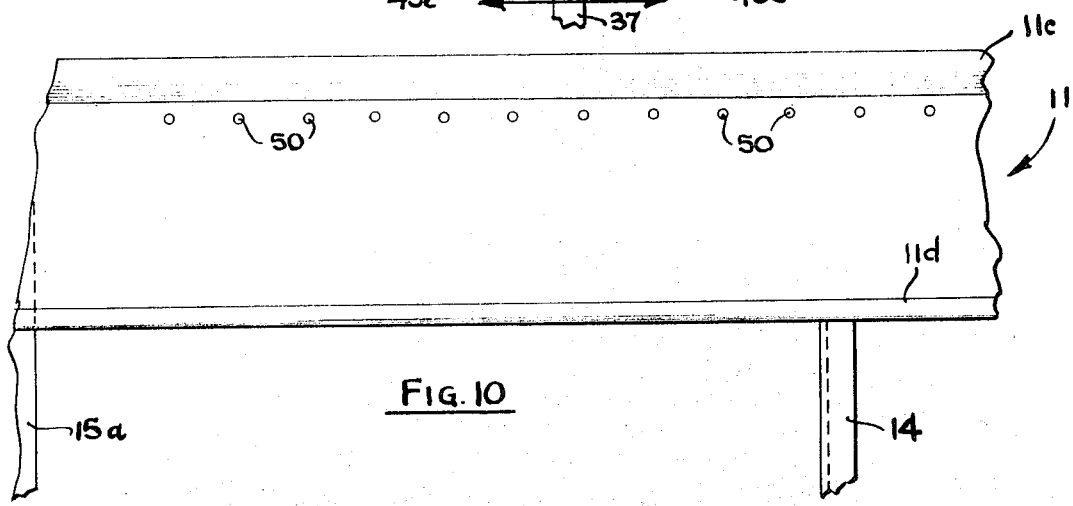
FIG. 10 is a top plan view of a portion of the runner structure of the embodiment of FIG. 1 showing the adjustable attachment means thereof.

Trailer wheels 35 are rotatably supported on the end portions 37a of underslung axle 37. Axle 37 is attached to the center portions of springs 40 as best shown in FIG. 4. The end portions of each spring 40 are attached to ear members 45a and 45d which subtend from each of bracket members 45. Bracket members 45 as shown in FIG. 9 have portions 45b and 45c which are angulated at right angles to each other. Fenders 49 are each respectively attached to an associated bracket member 45. The portions 45b of bracket members 45 have a plurality of attachment apertures 45e formed therein which are spaced so that they can mate with apertures 50 formed in runners 11 and 12 as shown in FIGS. 9 and 10. Bracket members 45 further have lip portions 45f, which overlap the bent-over ends of runner wall portions 12c. Apertures 50 are formed along a substantial length of the runners to permit the longitudinal adjustment of the position of the axle structure for optimum handling of the load. Bracket members 45 are secured to the runners by means of bolts 55 (FIG 1) which fit through the apertures and nuts (not shown). The wheel axle structure thus is conveniently attached to the runners for ready removal and repositioning therealong to afford optimum support of the vehicle to be towed as well as proper weight distribution of the load for ease of towing.

As best shown in FIG 11, the edge wall portions 12c and 12d of runner 12 (and similarly edge portions 11c and 11d of runner 11) are canted outwardly from the center of the runners. Angulated bar members 60 extend along the runner edges and are welded at one end to the bottoms of the runners and at the other end to the tops of the canted wall portions. Members 60 and the edge wall portions form triangulated braces which reinforce the edges. The triangular channels formed thereby may also be utilized to carry electrical wiring (not shown) for the vehicle lights.

Further reinforcement for the runners may be provided by means of brace members 62 which are welded to the bottom portions of the runners and extend substantially along the entire length thereof as shown in FIGS. 6 and 7. Braces 62 preferably have a hat-shaped cross-section as shown in FIG. 11 and are tapered from tall at the center toward the ends as shown in FIGS. 6 and 7 to provide additional reinforcement for the center of the trailer where the greater loads are encountered.

Figure 12:
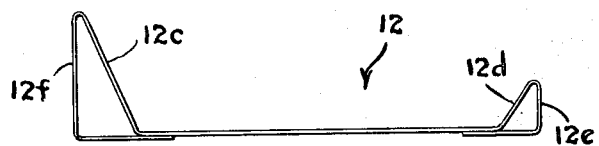
FIG. 12 is an end elevational view illustrating the runner structure of a second embodiment of the device of the invention.

Referring now to FIG. 12, an elevational end view of an alternate runner structure which may be utilized in the device of the invention is illustrated. In this runner structure, the edge wall portions 12c and 12d are canted away from the center of the runner 12 in the same manner as those of the embodiment of FIG. 11. However, rather than utilizing separate reinforcement members 60 to form the triangular reinforcement edge portions, reinforcement portions 12e and 12f are formed integrally with the runner structure by bending over the ends of the sheet metal forming such runner. The ends of the bent over portions 12e are welded to the bottom of runner 12. The embodiment of FIG. 12 also eliminates the bottom reinforcement member 62 of FIG. 11.

Referring now to FIG. 13 still another embodiment of the runner structure of the trailer is shown in an end elevational view. In this embodiment, the triangular edge portions are eliminated as well as the bottom reinforcement member. Edge wall portions 11c and 12d are canted in the same manner as the edge portion of the previous embodiment and have strip portions 12h and 12i respectively which are substantially parallel to the central portion of the runner.

The embodiments of FIGS. 12 and 13, while they provide a lesser strength than the embodiment of FIG. 11, are of a lighter weight and are suitable for utilization where the trailer is to be utilized for lighter loads and weight is of a prime consideration.

The trailer of this invention thus provides a device of simple and economical fabrication having a high strength to weight ratio, having features which make it relatively easy to handle and to adjust in the field for optimum load carrying capability.

I claim:

1. A trailer structure comprising:
a pair of substantially parallel runner members,
brace means interconnecting said runner members and holding them in spaced relationship,
triangular tongue means having a base portion and two side portions extending from said base portion to the apex of the triangle formed thereby, the apex of said tongue means being adapted for connection to a towing vehicle,
means for pivotally connecting the base portion of said tongue member to each of said runners, thereby enabling the tilting of said runners relative to said tongue member,
a pair of wheel members,
an axle interconnecting said wheel members, and
means for connecting said axle to said runner members comprising a pair of bracket members having first and second mutually orthogonal flat bar portions, the first of said flat bar portions having apertures formed therein, said runners having apertures formed therein spaced to mate with said bar portion apertures, the ends of said runners having lip portions which abut and rest against the ends of the second of said bar portions, means for removably attaching said bracket members to said runners at one of several predetermined positions along the longitudinal extent thereof including bolts fitted through selected ones of said apertures, and spring means for resiliently suspending said axle from said bracket members.

2. The trailer structure of claim 1 wherein said runners have outwardly angulated side wall portions running along the opposite edges thereof, the wall portions on the outer edges of said runners extending substantially higher than those on the inner edges thereof.

3. The trailer structure of claim 2 and further including angulated elongated bar members attached to said side wall portions to form hollow triangular reinforcement members along the runner edges.

4. The trailer structure of claim 1 wherein said means for pivotally connecting the base portion of the tongue member to each of said runner members comprises a pair of hinge members.

5. The trailer structure of claim 4 and further including means for selectively preventing pivotal motion of said tongue member relative to said runners, comprising sleeve members attached respectively to said runners and said tongue member and bolt members fitted through said sleeve members.

6. A trailer structure comprising:
a pair of substantially parallel runner members, said runners having outwardly angulated side wall portions running along the opposite edges thereof, the wall portions on the outer edges of said runners extending substantially higher than those on the inner edges thereof,
angulated elongated bar members attached to said runner side wall portions to form hollow triangular reinforcement members therealong,
brace means interconnecting said runner members and holding them in spaced relationship,
triangular tongue means having a base portion and two side portions extending from said base portion to the apex of the triangle formed thereby, the apex of said tongue means being adapted for connection to a towing vehicle,
means for pivotally connecting the base portion of said tongue member to each of said runners, thereby enabling the tilting of said runners relative to said tongue member,
a pair of wheel members,
an axle interconnecting said wheel members,
means for connecting said axle to said runners, and
brace members attached to the bottoms of said runner members and extending along substantially the entire length thereof, said brace members having a hat-shaped cross section tapered from the center towards the ends thereof.

7. A trailer structure for carrying a vehicle for towing comprising:
a pair of substantially parallel runners having outwardly angulated sidewall portions running along the edges thereof,
cross brace members holding said runners in spaced relationship, one of said brace members extending across the front edges of said runners and having a vertical portion forming a front stop,
a triangular tongue member having a base portion and two arm portions,
hinge means for pivotally connecting the opposite ends of said tongue member base portion to said runners to enable tilting motion of said runners relative to said tongue member for loading and unloading the vehicle, means for preventing pivotal motion of said runners relative to said tongue member with the runners in a towing position comprising first sleeves attached to the brace member extending across the front edges of said runners, second sleeves attached to said tongue member and bolts fitted through corresponding ones of said first and second sleeves to hold them together,
a pair of wheel members,
an axle interconnecting said wheel members,
means for connecting said axle to said runners comprising a bracket connected to each end of said axle and means for removably attaching each of said brackets to an associated one of said runners at a selected position therealong,
angulated elongated bar members attached to the runner side wall portions to form hollow triangularly cross sectioned members extending along the runner edges, and
brace members attached to the bottoms of said runners and extending along substantially the entire length thereof, said brace members having a hat-shaped cross section tapered from the center towards the ends thereof.

* * * * *